United States Patent [19]
Peterson, II

[11] Patent Number: 4,524,864
[45] Date of Patent: * Jun. 25, 1985

[54] BELT CONVEYOR GAP STRINGER SUPPORT SYSTEM

[76] Inventor: William D. Peterson, II, 1996 E. 4675 South, Salt Lake City, Utah 84117

[*] Notice: The portion of the term of this patent subsequent to Apr. 14, 1998 has been disclaimed.

[21] Appl. No.: 612,998

[22] Filed: May 21, 1984

Related U.S. Application Data

[63] Continuation of Ser. No. 367,563, Apr. 12, 1982.

[51] Int. Cl.³ .................................................. B65G 39/10
[52] U.S. Cl. ..................................... 198/828; 198/862; 52/31
[58] Field of Search .................... 52/31, 149; 198/827, 198/828, 830, 862

[56] References Cited
U.S. PATENT DOCUMENTS

| | | | |
|---|---|---|---|
| 1,366,944 | 2/1921 | Ritchie | 198/862 |
| 2,798,589 | 7/1957 | Wood | 198/827 |
| 3,285,393 | 11/1966 | Johnson | 198/827 |
| 3,348,663 | 10/1967 | Schmieder | 198/827 |
| 4,120,535 | 10/1978 | Delli-Gatti, Jr. | 198/827 |
| 4,139,087 | 2/1979 | Westhoff et al. | 198/864 |
| 4,261,460 | 4/1981 | Peterson, II | 198/828 |

FOREIGN PATENT DOCUMENTS

| | | | |
|---|---|---|---|
| 224592 | 10/1957 | Australia | 198/828 |
| 1063627 | 5/1954 | France | 198/830 |

Primary Examiner—Donald G. Kelly
Assistant Examiner—Michael Safavi

[57] ABSTRACT

A gap stringer conveyor belt support structure having a pair of spaced apart parallel stringers with rollers therebetween and a pair of underlying support frames. Each support frame includes a pair of generally vertical extensible load bearing posts each of which is connected at its upper end to a stringer and at its lower end to a weight bearing anchor. A third extensible post is connected at one end to a stringer and extends in a direction diagonally to the vertical posts to connect at its other end to an anchor. The weight bearing anchors may be imbedded in the ground. The connections between the extensible posts at the stringers and anchors are pivotal to permit adjustment by movement about at least an axis parallel to the stringers. Each extensible post is provided with a clamp or lock to hold it at a selected length.

10 Claims, 6 Drawing Figures

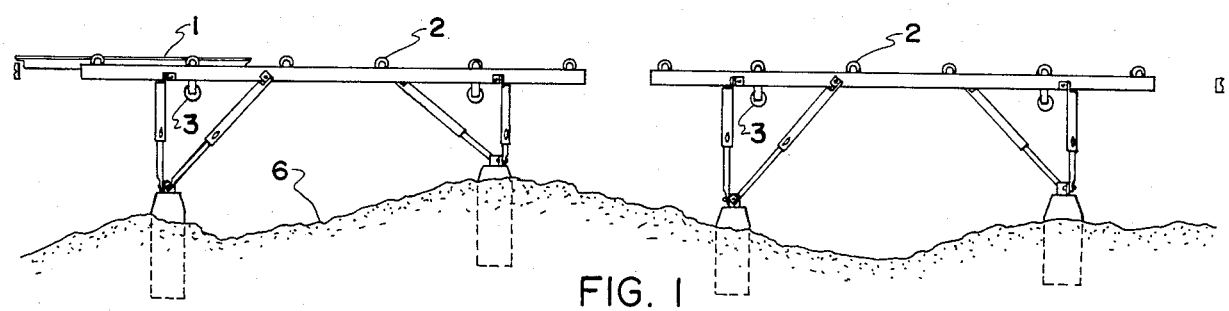
FIG. 1
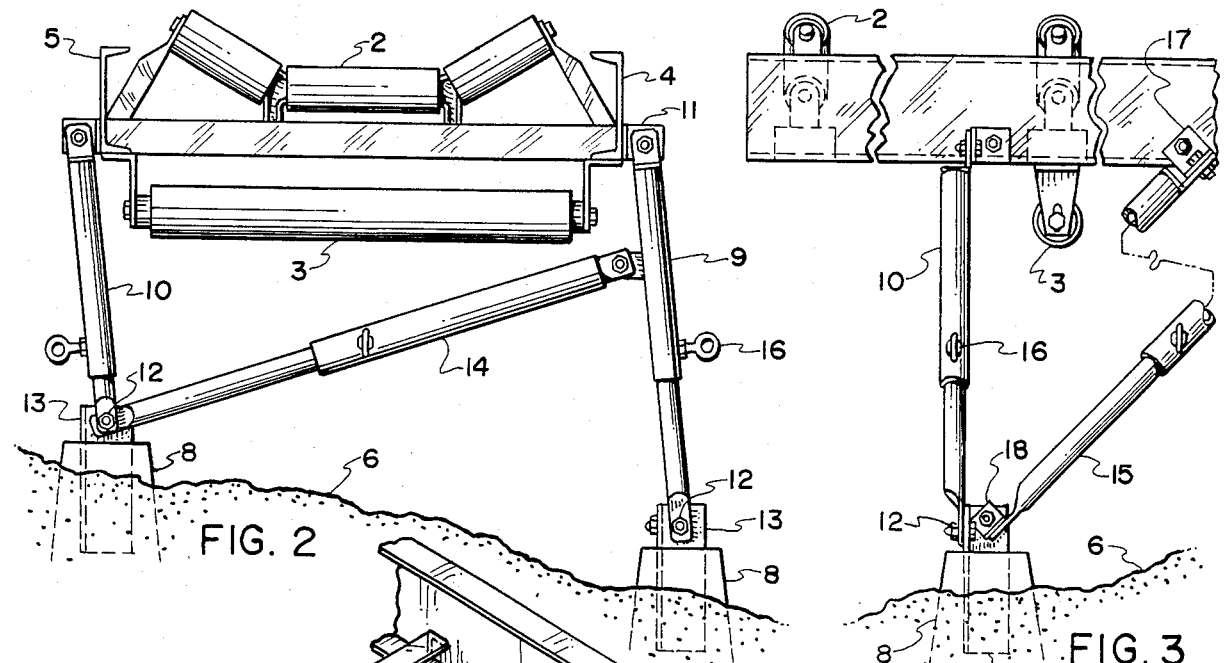
FIG. 2
FIG. 3
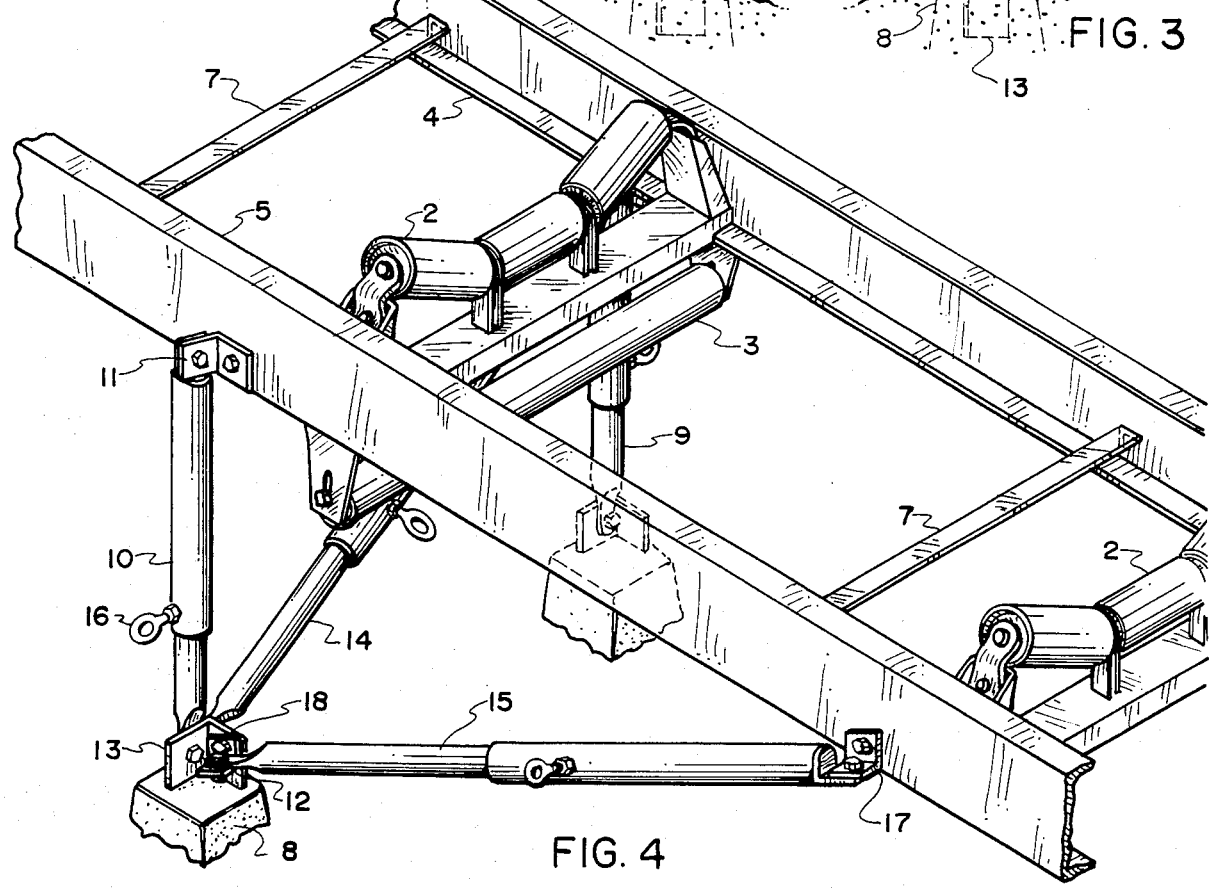
FIG. 4

BELT CONVEYOR GAP STRINGER SUPPORT SYSTEM

This is a continuation of Ser. No. 367,563, filed on Apr. 12, 1982.

FIELD AND BACKGROUND OF THE INVENTION

This invention relates generally to random length belt conveyors and particularly to the individual components thereof referred to as a belt conveyor gap stringer support.

In long overland conveyor systems it is common to utilize a plurality of spaced apart smaller components aligned to accept the continuous belt. The individual components are spaced apart to allow for thermal expansion and contraction. The spaces between adjacent sections being selected so that the span between adjacent rollers is the same. Heretofore in such systems, it has been usual to prepare meticulously located level concrete pads having precisely located anchor bolts on which to support the components. Invariably, this requires much excavation, levelling, form and concrete work reslting in much environmental damage not only in preparation for installation but also due to the elements during use and then again in clean-up after removal of the conveyor system.

It is evident that if overland conveyors can be installed without resort to extreme prelevelling and pad preparation much damage to the environment will be avoided with a consequent saving in construction cost and time. Moreover, removal of the conveyor and restoration of the sites will be simplified.

So far as I am aware, the only conveyor adapted to overland use on uneven terrain without meticulous site preparation is that described in my earlier U.S. Pat. No. 4,261,460 issued Apr. 14, 1981. That patent discloses and claims a Belt Conveyor Wire Rope Support System For Wire Rope Mounted Roller Idlers. The system utilizes a plurality of small adjustable frames supporting the continuous wire rope and in turn supported on small earth embedded anchors usually placed on uneven terrain with only coarse levelling. Typically, anchors are formed by pouring concrete in bored or drilled holes. Anchor means are left extending from the concrete.

SUMMARY OF THE INVENTION

It is the primary object of the present invention to provide a gap conveyor section of the type described but with an adjustable underlying support that will accomodate uneven terrain to provide a level support for the conveyor belt without more than very coarse grading and the provision of small anchor pads.

Another object is the provision of an adjustable support of the type described in which the available adjustment readily accomodates differences in elevation between the several anchor pads and will also accomodate misalignment of the anchor bolts or other attachment.

A related object is the provision of a gap stringer support that will enable lateral positioning of the gap stringer and rollers relative to the anchor pads to thus easily avoid brush or structures the like.

A still further, but related object is the provision of a gap stringer and support that can be mounted on a pre-stressed concrete pad or other exapnsible material and accomodate the dimension change without the necessity of modifying connection to the pad.

The foregoing and other objects of the invention are provided by a structute that includes, in combination with the parallel stringers and rollers, at least two underlying support frames each of which includes a pair of generally vertical extensible load bearing posts each of which is connected at its upper end to a stringer and at its lower end to a weight bearing anchor. A third extendsible post is connected at one end to a stringer and extends in a direction diagonlly to the vertical posts to connect at its other end to an anchor. The weight bearing anchors may be imbedded in the ground. The connections between the exensible posts at the stringers and anchors are pivotal to permit adjustment by movement about at least an axis parallel to the stringers. Each extensible post is provided with a clamp or lock to hold it at a selected length.

In some embodiments of the invention the pair of extensible members, which are usually tubes or posts, extends downwardly from the opposite stringers and connects to an anchor pad embedded in the earth. A stabilizer in the form of another extensible post connects from the top of one weight bearing post to a location adjacent the bottom of the other weight bearing member. To enhance accomodation of variation in elevtion between anchor pads and/or move the stringers laterally, the end connections of the extensible posts are connected to the structure and the anchors by pivotal connections that permit adjustment of the posts to achieve proper orientation of the stringers regardless of the terrain.

Stability is achieved by the diagonal third member. This can be connected to the same anchor as one of the vertical posts or may in special cases connect to a separate earth embedded anchor or even to a side wall as in a tunnel. Of course the diagonal can merely connect from near the top of one weight bearing post to a location near the bottom of the other post in the pair.

Each gap stringer is essentially a complete unit from 10 to 30 feet in length so each support structure according to the invention will include at least two adjustable frames. The total length of an overland system may be 3500 feet for a fabric belt and up to 15,000 feet with steel cable reinforced belts.

In order that the invention may be more readily understood and carried into effect, reference is made to the accompanying drawings and description thereof which are offered by way of example only and not in limitation of the invention the scope of which is defined solely by the appended claims and equivalents thereof.

BRIEF DESCRIPTION OF THE DRAWINGS

FIG. 1 is a side elevational view of two sections of an endless belt conveyor support embodying the invention. The belt is omitted.

FIG. 2 is a cross sectional view of one section of the structure shown in FIG. 1.

FIG. 3 is an enlarged side elevation view of the left end of one of the sections illustrated in FIG. 1.

FIG. 4 is an isometric view looking down onto the left end of one of the sections shown in FIGS. 1 and 2.

DETAILED DESCRIPTION OF THE DRAWINGS

Figure 5:
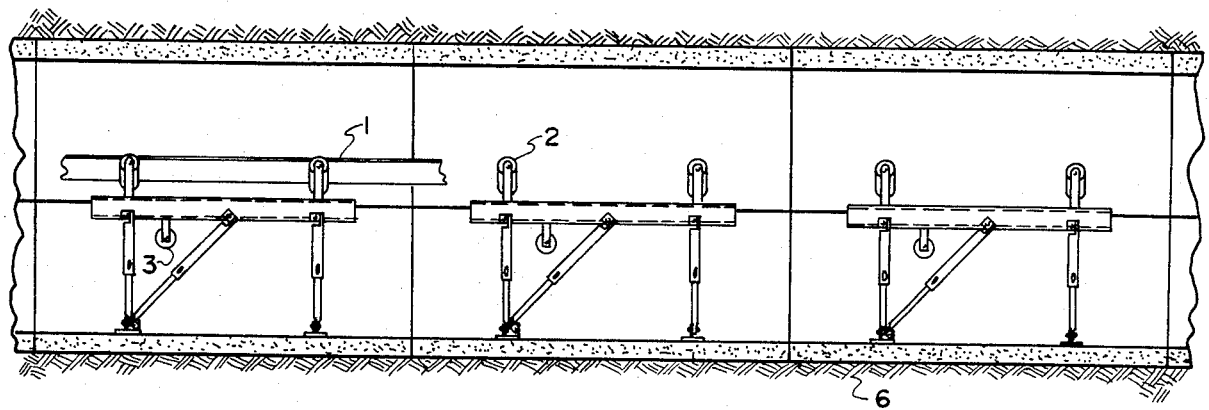
FIG. 5 is a side elevational view of three gap spanner sections in three tunnel sections as they would be attached and buried underground.

The drawings shown only the individual sections to which the invention is directed. It will be understood that any overland belt conveyor system has a head discharge end which has a head pulley where power is normally applied to pull the belt; and and a tail or loading end where the material to be carried is fed onto the belt 1. Between the head and tail the belt carrying idlers 2 and return idlers 3 are supported between two spaced apart stringers 4,5 suspended above the ground 6. The stringers are connected to each other by the idlers 2,3, or other structural members 7. In a long conveyor system the parallel frames 4–5 are usually about four feet apart. Earth embedded concrete anchor pads 8 are provided and the main structural members 4, 5 and 7 are supported thereabove by the pairs of extensible posts 9 and 10. These post are secured to the stringer by an angle 11 and to the anchor by a similar attachment such as a bolt 12 and a protruding reinforcement 13 cast into the anchor. Other types of anchors include a buried post or driven piles. The extensible weight bearing posts 9 and 10 supporting the stringers 4–5 are provided in pairs, arranged along opposite sides of the stringers. Once the length of the posts is properly adjusted, a stabilizer is connected diagonally between the top of one post 9 and the bottom of the opposite post 10. The diagonal post being adjusted to proper length to accomplish this. The vertical post 9 is also supported against longitudinal swaying by an additional extensible extending diagonally between the point on the stringer spaced longidudinally from the post and the anchor to which the post is secured. Thus, the entire assembly is supported by four load bearing posts and is braced against cross swaying by two cross diagonal braces 14, and against longitudinal sway by two longitudinal diagonal braces 15. Of course, the adjustable columns 9-10 also maintain the frame 4–5 -7 in a planate configuration.

Figure 6:
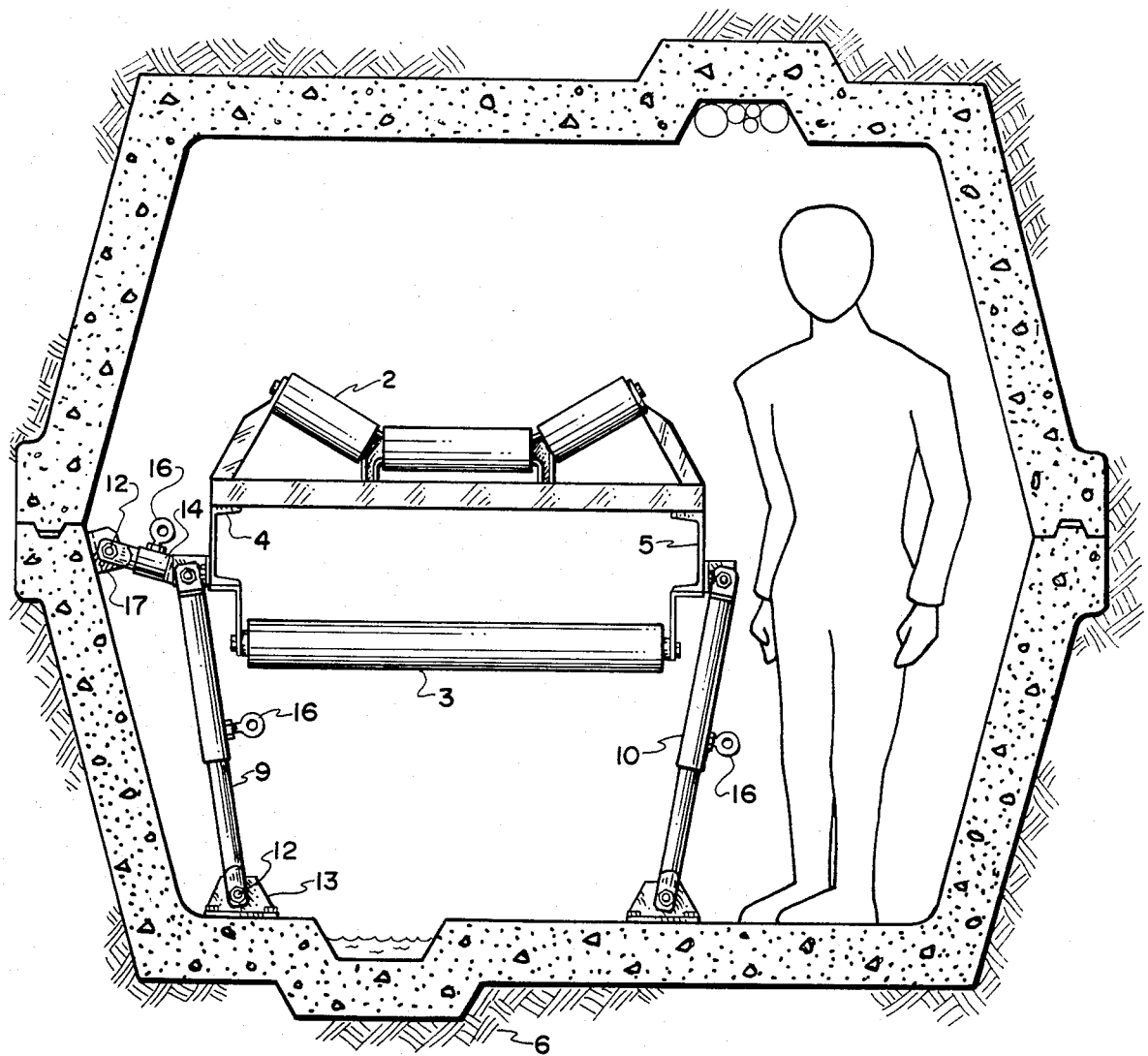
FIG. 6 is a cross sectional view looking into the tunnel shown in FIG. 5.

By adjusting the lengths of the upright columns 9-10 and the length of the elongated diagonal cross brace 14, and elongated side brace 15 correctly, the frames 4–5 will be in their correct parallel positions. It is possible that the stringers may take a final position that is not directly above the weight bearing anchor. However, this is satisfactory as weight bearing posts need not be strictly vertical. All of the extensible posts are provided with means such as a clamp or set screw 16 to hold them at a selected length. Before everything is tightened finally, the weight bearing posts and the diagonal posts are capable of pivoting about their connecting bolts which, depending upon orientation, provide axis that are parallel or transverse to the stringers. The cross braces are usually connected to the same anchor as the opposite weight bearing post. However, another embodiment useful under different conditions, is to employ an entirely separate anchor such as an attachment 17 to a tunnel sidewall as shown in FIG. 6.

As noted, the invention is especially useful in situations where precast tunnel sections are buried and the tunnels used as a housing for a temporary or permanent conveyor installation. This is illustrated in FIGS. 5 and 6 in which the adjustable gap stringer sections of the invention may be placed in the tunnel sections before burying. After burying, the frames are adjusted to provide final precise alignment.

In connection with adjustment, it may be useful to have the connection of the extensible post ends accomplished by a universal type connection such as provided by elements 13 and 18 in FIG. 4. In other cases, some limited adjustment may be provided by bending the flattened lower ends of the weight bearing posts as shown in FIG. 6.

It will be obvious that because of its ability to accomodate uneven terrain the invention will in some cases permit installation of a conveyor with virtually no land levelling. In any case, the need for such work will be minimized.

I claim:

1. In a gap stringer conveyor belt carrying structure of the type which includes a pair of parallel spaced apart rigid stringers with belt carrying rollers therebetween, the improved underlying support for said structure which comprises in combination at least two spaced-apart load-bearing frames under said stringers each of said frames including a pair of extensible load bearing members each connected at one end to said structure to receive a part of the weight thereof and at its other end to a weight bearing anchor, a third extensible member connected at one end to said strucuture thence extending in a direction that is diagonally transverse to and in substantially the same plane as said pair of extensible load bearing members to terminate in a connection to an anchor, all of said extensible members being provided with means for fixing them at a selected length, at least said extensible weight bearing members being connected to said belt support structure and said weight bearng anchors by pivotal connections enabling their adjustment by pivoting at least about an axis parallel to said stringers, and at least one additional extensible rigid member extending diagonally between a connection adjacent the lower end of one of said extensible load bearing members and a point of connection on one of said stringers.

2. The structure according to preceding claim 1 in which each end of said third extensible member is connected by means enabling adjustment by prvoting about an axis parallel to said stringer.

3. The structure according to preceding claim 1 in which each of said extensible weight bearing members is formed for limited bending adjacent its opposite ends in planes that include the axis of its pivotal connection to said anchor and said structure.

4. The structure according to preceding claim 1 in which said anchor to which said third extensible post connects is a location on one of said weight bearing posts.

5. The structure according to preceding claim 1 in which said anchor to which the third extensible post is connected is one of said weight bearing anchors, and one of said weight bearing members and said third extensible member both connect to said anchor for pivoting about a common axis.

6. The structure according to claim 1 in which said anchor to which said third extensible post connects is an anchor separate from that to which said weight bearing extensible members connect.

7. A structure according to claim 1 in which the floor of a pre-cast tunnel section forms the weight bearing anchor under all of said extensible weight bearing posts.

8. In a gap stringer conveyor belt carrying structure of the type which includes a pair of parallel spaced apart rigid stringers with belt-carrying rollers therebetween, the improved underlying support for said structure which comprises in combination at least two spaced apart load bearing frames under said stringers each of said frames including a pair of extensible load-bearing members each connected at one end to said structure to receive a part of the weight thereof and at its other end to a load-bearing anchor, a third extensible member connected at one end to said structure thence extending in a direction that is diagonally transverse to and in substantially the same plane as said pair of extensible load bearing members to terminate in a connection to an anchor, all of said extensible members being provided with means for fixing them at a selected length, at least said extensible load-bearing members being connected to said belt support structure and said load bearing anchors by pivotal connections enabling their adjustment by pivoting at least about an axis parallel to said stringers, and at least one additional extensible rigid member extending diagonally between a connection adjacent the lower end of one of said extensible load-bearing members and a point of connection on one of said stringers said last named connection enabling said additional extensible rigid member to be adjusted by pivoting in a plane transverse to said stringer.

9. The structure according to preceding claim 8 in which said extensible weight bearing members are pivotally connected to said anchor and said structure by universal connections enabling pivoting about an axis parallel to said stringers and about an axis normal to the axis of said stringers.

10. In a gap stringer conveyor belt carrying structure of the type which includes a pair of parallel spaced rigid stringers with belt-carrying rollers therebetween, the improved underlying support for said structure which comprises in combination at least two spaced-apart load bearing frames under said stringers each of said frames including a pair of extensible load bearing members each connected at one end to said structure to receive a part of the weight thereof and at its other end to a weight bearing anchor, a third extensible member connected at one end to said structure thence extending in a direction that is diagonally transverse to and in substantially the same plane as said pair of extensible load bearing members to terminate in a connection to an anchor, all of said extensible members being provided with means for fixing them at a selected length, and at least said extensible load bearing members being connected to said belt support structure and said weight-bearing anchors by pivotal connections enabling their adjustment by pivoting at least about an axis parallel to said stringers.

* * * * *